Aug. 16, 1960  H. J. STUART  2,949,380
COATING COMPOSITIONS CONTAINING EPOXYHYDROXY
POLYETHER RESIN AND THE REOPERATION
OF ALKYD ENAMELS WITH SAME
Filed March 21, 1957
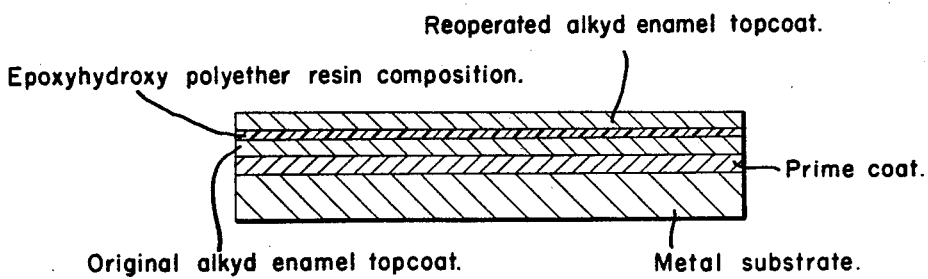
INVENTOR
HAROLD JENNINGS STUART
BY
AGENT

United States Patent Office 2,949,380
Patented Aug. 16, 1960

2,949,380

COATING COMPOSITIONS CONTAINING EPOXY-HYDROXY POLYETHER RESIN AND THE RE-OPERATION OF ALKYD ENAMELS WITH SAME

Harold Jennings Stuart, Salem, N.J., assignor to E. I. du Pont de Nemours and Company, Wilmington, Del., a corporation of Delaware Filed Mar. 21, 1957, Ser. No. 647,569

11 Claims. (Cl. 117—2)

This invention relates to a chemical composition and to a chemical process. More particularly it relates to an epoxyhydroxy polyether resin composition which is used in reoperating alkyd enamels.

Scratches, uncoated spots and other imperfections often appear in the surface of painted articles during their manufacture and during their use. For this reason it is often desirable to reoperate the topcoat on such articles, that is, applying a second layer of the topcoat over the original baked topcoat. Heretofore it has been very difficult to get good adhesion between an original, cured, alkyd resin topcoat and a subsequently applied alkyd resin topcoat, without first sanding the original topcoat. This is particularly true of the alkyd resin/aminotriazine resin enamel topcoats used on refrigerators and other appliances and on automobiles. Sanding the original topcoat, however is a tedious, expensive, and dirty process, especially where the surface to be sanded is difficult to reach.

I have discovered a process for reoperating alkyd enamels without first sanding the original cured topcoat.

The process of this invention comprises applying a thin intermediate layer of epoxyhydroxy polyether resin coating composition to the original baked alkyd enamel topcoat, applying a layer of alkyd enamel over the intermediate epoxyhydroxy-polyether resin layer, and baking the resulting finishing system. The epoxyhydroxy polyether resin coating composition comprises solvent, 100 parts by weight of epoxyhydroxy polyether resin having an epoxide equivalent of at least about 1300 and a melting point of at least about 115° C., a curing agent in an amount chemically combinable with about from 5 to 100 percent of the epoxide groups on the resin and from 10 to 25 parts by weight of a swellable, organic ammonium-modified, aluminum silicate clay. Preferably the composition contains solvent, 100 parts by weight of epoxyhydroxy polyether resin having an epoxide equivalent of about from 2400 to 4000 and a melting point of from 145 to 155° C., curing agent in an amount chemically combinable with from 10 to 25 percent of the epoxide groups in the resin, and about from 12 to 16 parts by weight of the swellable, organic ammonium-modified, aluminum silicate clay.

A metal sheet which was reoperated by the process and with the composition of this invention is shown in the accompanying drawing.

The epoxyhydroxy polyether resin used in the coating composition of this invention is formed by the condensation of a polyhydric phenol and an epoxy hydroxy contributing compound to yield a polymer having a plurality of ether oxygen atoms interspersed in the polymer chain. The polymer molecules also have terminal epoxy groups, that is, groups represented by the formula:

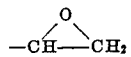

each of which is chemically combinable on an equivalent basis with one active group on the curing agent, such as an acidic hydroxyl group in orthophosphoric acid.

The epoxyhydroxy polyether resins useful in this invention have a relatively high molecular weight and are characterized by having an epoxide equivalent of at least about 1300 and preferably 2400 to 4000 and a melting point of at least about 115° C. and preferably 145° to 155° C. Epoxide equivalent as used herein refers to the gram equivalent weight of the resin, that is, the grams of resin which contain one gram equivalent of epoxy groups. Lower molecular weight products migrate into the topcoat which is subsequently applied and destroy its gloss.

Polyhydric phenols which can be used for making the epoxyhydroxy polyether resin include, polynuclear phenols such as, for example, diphenylol propane, bis-(p-hydroxyphenyl)-1,1-ethane, p,p'-dihydroxybenzophenone, p,p'-dihydroxydiphenyl and analogous polyhydric naphthalenes. Diphenylol propane which is frequently referred to as bis-phenol or more specifically as bis-(p-hydroxyphenyl)-2,2-propane is preferred. Epoxyhydroxy contributing compounds which can be used in forming the resin include, for example, epihalohydrins such as epichlorohydrin epibromohydrin and epihalohydrins of mannitol, sorbitol and erythritol. Epichlorohydrin is the preferred epoxyhydroxy contributing reactant. The method of preparing these resins is described in more detail in U.S. Patents 2,456,408, 2,503,726, 2,582,985, 2,592,560 and 2,694,694.

The curing agent for the epoxyhydroxy polyether resin can be, for example, a phosphoric acid such as orthophosphoric acid, metaphosphoric or pyrophosphoric acid; a monoalkyl orthophosphate such as monobutyl orthophosphate or monopropyl orthophosphate; a strong organic acid such as acetic acid or propionic acid; a diamine such as ethylene diamine or propylene diamine; or a combination thereof.

Orthophosphoric acid is the preferred curing agent. Unlike many other curatives, the orthophosphoric acid as excellent rust inhibiting properties. Whenever the orthophosphoric acid containing composition comes in contact with exposed ferroginous metal, some of the unreacted acidity of the orthophosphoric acid reacts with the metal to inhibit corrosion. For an epoxyhydroxy polyether resin having an epoxide equivalent of 2400 to 4000, about from 0.05 to 1.0 and preferably 0.10 to 0.25 part by weight of orthophosphoric acid are included in the composition per 100 parts by weight of resin.

The swellable, organic ammonium-modified, aluminum silicate clays used in this invention are organophilic and are characterized by their ability to swell in organic solvents. The modified clays are prepared from naturally occuring montmorillonite clays which are complex aluminum silicates. Typical examples of the clays include sodium, potassium, lithium and magnesium bentonites. These clays have base-exchange capacities of above 25, based upon the milli-equivalents of exchangeable base per 100 grams of clay.

The montmorillonite clays are treated with an organic ammonium compound, for example, a quaternary ammonium compound such as dimethyl dioctadecyl ammonium chloride or diethyl didodecyl ammonium chloride; or salts, such as acetates and chlorides, of aliphatic, alicyclic, aromatic, and heterocyclic, primary, secondary and tertiary amines, such as dodecyl, octadecyl, lauryl dimethyl, or octadecenyl amine.

The aforementioned organic ammonium compounds react with the clay and replace some of the cations, that is, the sodium, potassium, lithium or magnesium cations, in the clay lattice with organic radicals. This renders the initially hydrophilic material, organophilic.

When it is used in the composition of this invention, the treated montmorillonite clay absorbs solvent and swells. Without this material the composition of this invention does not form smooth continuous films, but instead, collects in drops on the surface to be reoperated much as water collects on an oily surface. This type of treated montmorillonite clay is described in more detail in U.S. Patent 2,531,427.

Solvents for the epoxyhydroxy polyether resin composition include, for example, aromatic coal tar and petroleum solvents, alcohols, ether-alcohols, and ketones, such as xylol, toluol, benzol, butyl alcohol, diacetone alcohol, acetone, cellosolve and mixtures thereof. Solvents which boil below about 175° C. are preferred.

The epoxyhydroxypolyether resin coating composition of this invention can be pigmented and formulated by methods conventionally used in the coating art, then employed as a primer; however, the distinguishing property of this composition is that it can be used as an intermediate coat to adhere alkyd enamel topcoats to imperfect, baked, alkyd enamel topcoats. One class of alkyd enamels which show particularly poor adhesion when they are reoperated are those containing as their principal film-forming constituents a mixture of an oil-modified alkyd resin and a formaldehyde condensation resin. Alkyd enamels having as their principal film-forming constituents 70 to 50% by weight of coconut oil-modified glycerol or pentaerythritol phthalate alkyd resin and from 30 to 50% by weight of melamine formaldehyde resin are especially difficult to reoperate without sanding the original baked topcoat or using the composition of this invention. The aforementioned oil-modified alkyd resin/formaldehyde condensation resin enamels are described in more detail in U.S. Patents Nos. 2,218,474, 2,437,657 and 2,648,642.

Alkyd enamels are reoperated by the process of this invention by first applying a thin coat of the epoxyhydroxy polyether resin over the baked topcoat which is to be reoperated. The epoxydroxy polyether resin composition can be applied by any of the conventional fluid coating techniques such as, for example, spray, dip, roller, and brush coating. For spray coating, compositions containing about from 15 to 20% by weight of solids are preferred.

The epoxyhydroxy polyether resin composition is preferably applied in a very thin continuous coat about from 0.1 to 0.2 mil thick. When a very thin coat of the epoxyhydroxy polyether resin composition is applied, for example, by spraying, the solvent evaporates or flashes off almost as fast as the coating is applied. Consequently, the next succeeding alkyl enamel coat can be applied after the epoxyhydroxy polyether resin composition has dried for only one or two minutes. When thicker coatings of the epoxyhydroxy polyether resin composition are applied, the composition must be allowed to dry for several minutes before the reoperated topcoat of alkyd enamel is applied.

The alkyd enamel refinish topcoat is applied directly over the unbaked epoxyhydroxy polyether resin composition, then baked. The refinish topcoat can be applied and baked in the same conventional manner used for the original enamel topcoat. Usually, the refinish alkyd enamel topcoat is applied in about a 1- to 2-mil film and baked at from 70° C. to 180° C. for about from 60 to 10 minutes. Baking the alkyd enamel topcoat also advances the curing of the intermediate epoxyhydroxy polyether resin composition thereby yielding a multi-layer finishing system with excellent intercoat adhesion.

By applying the coating composition of this invention to surfaces to be reoperated, it is possible to get good intercoat adhesion between an original baked topcoat and a refinish topcoat without standing the original topcoat and without first baking the intermediate coat. The process and composition of this invention are particularly useful in reoperating alkyd enamels. Heretofore, when many alkyd enamels were applied directly to the original topcoat, the resulting finishing system showed very poor intercoat adhesion. The composition and process of this invention are particularly useful in reoperating alkyd enamels on automobiles and appliances such as refrigerators, washing machines and stoves.

The following examples are intended to illustrate the invention and not to limit it in any way. Parts are by weight unless otherwise specified.

EXAMPLE I

*Preparation of epoxyhydroxy polyether resin coating composition*

A coating composition having the following formulation was prepared:

| | Parts |
|---|---|
| Epoxyhydroxy polyether resin | 100 |
| Swellable, organic ammonium-modified, aluminum silicate clay—"Bentone-34" (National Lead Co.) | 14.6 |
| 85% orthophosphoric acid | 0.22 |
| Xylol | 290 |
| Diacetone alcohol | 90 |
| Cellosolve | 199 |

The epoxyhydroxy polyether resin was first dissolved in a mixture of equal parts of xylol and diacetone alcohol. Next the swellable, organic ammonium-modified, aluminum silicate clay was dispersed in part of the resin solution and diluted with more solvent. The phosphoric acid was dispersed in equal parts of xylol and cellosolve. Finally the three portions were mixed to give the composition shown above. The epoxyhydroxy polyether resin which was used was formed by the reaction of diphenylol propane with a molar excess of epichlorohydrin and had the following properties.

| | |
|---|---|
| Epoxide equivalent, grams | 2400 to 4000. |
| Melting point, °C. | 145 to 155. |
| Gardner-Holdt viscosity at 25° C. in a 40% solution of butyl carbitol | Z–2 to Z–5. |
| Refractive index, 20° C. | 1.601. |

*Reoperation of the alkyd enamel*

The panel which was reoperated consisted of a primed sheet of steel coated with standard baked alkyd washing machine enamel. This baked enamel consisted essentially of 35 parts of coconut oil modified pentaerythriol phthalate alkyd resin, 19 parts melamine formaldehyde resin and 46 parts of pigment consisting principally of titanium dioxide. The coconut oil modified pentaerythritol phthalate had an oil length of approximately 37 (percent by weight of coconut oil acid calculated at triglyceride in the alkyd).

A film, about 0.2 mil thick, of the epoxyhydroxy polyether resin composition described above was sprayed onto the original baked topcoat. As the film was sprayed, the solvent flashed off leaving an essentially dry film. An alkyd enamel containing solvent and the same solids composition as that of the original topcoat was sprayed over the intermediate epoxyhydroxy polyether resin composition layer. Finally, the resulting finishing system was baked for 30 minutes at about 177° C.

*Evaluation of reoperated coating*

The adhesion of the multi-layer coating was evaluated by scraping the tip of a knife blade over the surface of the refinish topcoat. When the refinish topcoat was scraped it did not chip or flake off. Even when the finishing system was cut through to the metal the individual layers of the multi-layer coating did not separate.

A control was run by applying the refinish enamel topcoat described above directly over the original alkyd enamel topcoat, then baking the resulting finishing system for 30 minutes at about 177° C. When this system was scraped with a knife blade, the refinish topcoat shattered and flaked off the original topcoat.

The grease, water and impact resistance and gloss of the finishing system containing an intermediate layer of the epoxyhydroxy polyether resin of this invention were excellent. Soap and detergent resistance and flexiblity of the system were slightly poorer than those of the original topcoat but still satisfactory.

EXAMPLE II

An epoxyhydroxy polyether resin coating composition was prepared from the materials and by the procedure described in Example I; however, 100 parts of epoxyhydroxy polyether resin reaction product of diphenol propane and epichlorohydrin having the following properties were substituted for the resin in that example.

| | |
|---|---|
| Epoxide equivalent, grams | 1550 to 2000. |
| Gardner-Holdt viscosity at 25° C. in a 40% solution of butyl carbitol | Y to Z–1. |
| Melting point, ° C. | 127 to 133. |
| Refractive index | 1.598. |

This epoxyhydroxy polyether resin coating composition was used in reoperating the alkyd enamel described in Example I. The same reoperating procedure used in that example was followed. The resulting baked finishing system had the same excellent properties as those of the preceding example.

When the aforementioned alkyd enamel was reoperated by the procedure shown in Example I using an intermediate layer containing epoxyhydroxy polyether resin having a melting point of about 100° C. and an epoxide equivalent of about 1000, the resulting, dried finishing system had poor gloss. This was attributed to migration of the epoxyhydroxy polyether resin into the superposed enamel topcoat.

EXAMPLE III

Two panels were reoperated with the materials and by the procedure shown in Example I; however, in one run 0.44 and in the second run 0.66 part of 85% orthophosphoric acid per 100 parts of epoxyhydroxy polyether resin were used as the curing agent. The resulting baked finishing system had properties comparable to those of the system shown in Example I. Excess curing agent over that required to react with 100% of the epoxy groups in the epoxyhydroxy polyester resin can be used; however, using the excess curing agent does not improve the adhesion and other properties of the resulting system over the properties shown in the preceding examples. With some curing agents, a very large excess of the agent may cause corrosion or fluocculate the pigment, destroy the gloss or catalyze the resins in the refinish topcoat.

EXAMPLE IV

A coating composition was prepared from the following materials.

| | Parts |
|---|---|
| Epoxyhydroxy polyether resin (same as Example I) | 100 |
| Swellable organic ammonium-modified aluminum-silicate clay (same as Example I) | 14.7 |
| Ethylene diamine | 6.2 |
| Xylol | 286 |
| Cellosolve | 153 |
| Diacetone alcohol | 133 |
| Toluol | 6.69 |
| n-Butyl alcohol | 6.67 |

A panel topcoated with the enamel described in Example I was reoperated by the procedure shown in that example. The epoxyhydroxy polyether resin composition shown above was used as the intermediate coat.

The baked finishing system of this example had excellent intercoat adhesion but at uncoated places where the epoxyhydroxy polyether resin layer was in direct contact with the steel panel, the panel rusted after immersion in hot soap solution. In the preceding examples in which orthophosphoric acid was used as the curing agent for the epoxyhydroxy polyether resin, the steel panels did not rust at these uncoated spots. The epoxyhydroxy polyether resin composition of this example also had rather low shelf-life.

I claim:
1. A coating composition consisting essentially of solvent, 100 parts by weight of epoxyhydroxy polyether resin having an epoxide equivalent of at least about 1300 and a melting point of at least about 115° C., curing agent for said epoxyhydroxy polyether resin in an amount chemically combinable with about from 5 to 100% of the epoxy groups in said resin, and about from 10 to 25 parts by weight of a swellable, organic ammonium-modified, aluminum silicate clay, said epoxyhydroxy polyether resin being present in solution in said solvent.

2. A coating composition consisting essentially of solvent, 100 parts by weight of epoxyhydroxy polyether resin having an epoxide equivalent of at least about 1300 and a melting point of at least about 115° C., orthophosphoric acid in an amount chemically combinable with about from 5 to 100% of the epoxy groups in said resin, and about from 10 to 25 parts by weight of a swellable, organic ammonium-modified, aluminum silicate clay, said epoxyhydroxy polyether resin being present in solution in said solvent.

3. A coating composition consisting essentially of solvent, 100 parts by weight of epoxyhydroxy polyether resin having an epoxide equivalent of about from 2400 to 4000 and a melting point of about from 145 to 155° C., about from 0.05 to 1.0 parts by weight of orthophosphoric acid, and about from 10 to 25 parts by weight of swellable, organic ammonium-modified, aluminum silicate clay, said epoxyhydroxy polyether resin being present in solution in said solvent.

4. A coating composition consisting essentially of solvent, 100 parts by weight of epoxyhydroxy polyether resin having an epoxide equivalent of about from 2400 to 4000 and a melting point of about from 145 to 155° C., about from 0.05 to 1.0 part by weight of orthophosphoric acid, and about from 12 to 16 parts by weight of swellable, organic ammonium-modified aluminum silicate clay, said epoxyhydroxy polyether resin being present in solution in said solvent.

5. A coating composition consisting essentially of 100 parts by weight of epoxyhydroxy polyether resin having an epoxide equivalent of about from 2400 to 4000 and a melting point of about from 145 to 155° C., about from 0.10 to 0.25 part by weight of orthophosphoric acid, about from 12 to 16 parts by weight of swellable, organic ammonium-modified, aluminum silicate clay and about from 400 to 600 parts by weight of solvent, said epoxyhydroxy polyether resin being present in solution in said solvent.

6. A metal article having a coating comprising a primer coat and a superposed multi-layer topcoating system in adherent contact therewith, said multi-layer topcoating system comprising a baked intermediate layer consisting essentially of 100 parts by weight of epoxyhydroxy polyether resin having an epoxide equivalent of at least about 1300 and a melting point of at least about 115° C., a curing agent for said epoxyhydroxy polyether resin in an amount chemically combinable with about from 5 to 100% of the epoxy groups in said resin and about from 10 to 25 parts by weight of a swellable, organic ammonium-modified, aluminum silicate clay, said intermediate layer being between and in adherent contact with two baked layers of alkyd enamel.

7. A metal article having a coating comprising a primer coat and a superposed multi-layer topcoating system in adherent contact therewith, said multi-layer topcoating system comprising a baked intermediate layer consisting essentially of 100 parts by weight of epoxyhydroxy polyether resin having an epoxide equivalent of at least about 1300 and a melting point of at least about 115° C., curing agent for said epoxyhydroxy polyether resin in an amount chemically combinable with about from 5 to 100 percent of the epoxy groups in said resin and about from 10 to 25 parts by weight of a swellable, organic ammonium-modified, aluminum silicate clay, said intermediate layer being between and in adherent contact with two baked layers of alkyd enamel, said baked layers of alkyd enamel having as their principal film-forming constituents a mixture of oil-modified alkyd resin and formaldehyde condensation resin.

8. A metal article having a coating comprising a primer coat and a superposed multi-layer topcoating system in adherent contact therewith, said topcoating system comprising a baked intermediate layer consisting essentially of 100 parts by weight of epoxyhydroxy polyether resin having an epoxide equivalent of at least about 1300 and a melting point of at least about 115° C., curing agent for said epoxyhydroxy polyether resin in an amount chemically combinable with about from 5 to 100% of the epoxy groups in said resin and about from 10 to 25 parts by weight of a swellable, organic ammonium-modified, aluminum silicate clay, said intermediate layer being between and in adherent contact with two baked layers of alkyd enamel, said baked layers of alkyd enamel having as their principal film-forming constituents a mixture of about from 70 to 50 parts by weight of coconut oil-modified alkyd resin and about from 30 to 50 parts by weight of melamine-formaldehyde resin.

9. A process for reoperating alkyd enamels which comprises applying to the baked surface to be reoperated a coat of a composition consisting essentially of solvent, 100 parts by weight of epoxyhydroxy polyether resin having an epoxide equivalent of at least about 1300 and a melting point of at least about 115° C., curing agent for said epoxyhydroxy polyether resin in an amount chemically combinable with about from 5 to 100% of the epoxy groups in said resin and about from 10 to 25 parts by weight of swellable, organic ammonium-modified, aluminum silicate clay, said epoxyhydroxy polyether resin being present in solution in said solvent, applying a coat of alkyd enamel over said coat of epoxyhydroxy polyether resin composition and making the resulting finishing system.

10. A process for reoperating alkyd enamels which comprises spraying onto the baked surface to be reoperated a coat about from 0.1 to 0.2 mil thick of a composition consisting essentially of solvent, 100 parts by weight of epoxyhydroxy polyether resin having an epoxide equivalent of at least about 1300 and a melting point of at least about 115° C., curing agent for said epoxyhydroxy polyether resin in an amount chemically combinable with about from 5 to 100% of the epoxy groups in said resin and about from 10 to 25 parts by weight of swellable, organic ammonium-modified, aluminum silicate clay, said epoxyhydroxy polyether resin being present in solution in said solvent, applying a coat of alkyd enamel over said coat of epoxyhydroxy polyether resin composition and baking the resulting finishing system.

11. A process for reoperating alkyd enamels which comprises spraying onto the baked surface to be reoperated a coat about from 0.1 to 0.2 mil thick of a composition consisting essentially of solvent, 100 parts by weight of epoxyhydroxy polyether resin having an epoxide equivalent of at least about 1300 and a melting point of at least about 115° C., curing agent for said epoxyhydroxy polyether resin in an amount chemically combinable with about from 5 to 100% of the epoxy groups in said resin and about from 10 to 25 parts by weight of swellable, organic ammonium-modified, aluminum silicate clay, said epoxyhydroxy polyether resin being present in solution in said solvent, applying a coat of alkyd enamel over said coat of epoxyhydroxy polyether resin composition and baking the resulting finishing system at about from 70 to 180° C. for about from 60 to 10 minutes.

References Cited in the file of this patent

UNITED STATES PATENTS

| | | |
|---|---|---|
| 2,541,027 | Bradley | Feb. 13, 1951 |
| 2,615,007 | Greenlee | Oct. 21, 1952 |
| 2,694,694 | Greenlee | Nov. 16, 1954 |
| 2,698,315 | Greenlee | Dec. 28, 1954 |
| 2,773,043 | Zukas | Dec. 4, 1956 |

UNITED STATES PATENT OFFICE

CERTIFICATE OF CORRECTION

Patent No. 2,949,380                              August 16, 1960

Harold Jennings Stuart

It is hereby certified that error appears in the printed specification of the above numbered patent requiring correction and that the said Letters Patent should read as corrected below.

Column 3, line 36, for the patent number "2.648,642" read -- 2,648,642 --; line 73, for "standing" read -- sanding --; column 4, line 48, for "pentaerythriol" read -- pentaerythritol --; column 8, line 1, for "making" read -- baking --.

Signed and sealed this 31st day of January 1961.

(SEAL)
Attest:

KARL H. AXLINE                                    ROBERT C. WATSON
Attesting Officer                                 Commissioner of Patents